United States Patent
Nakamoto et al.

(10) Patent No.: US 11,271,211 B2
(45) Date of Patent: Mar. 8, 2022

(54) ANODE CURRENT COLLECTOR, CONDUCTIVE MATERIAL, AND FLUORIDE ION BATTERY

(71) Applicants: TOYOTA JIDOSHA KABUSHIKI KAISHA, Toyota (JP); KYOTO UNIVERSITY, Kyoto (JP)

(72) Inventors: Hirofumi Nakamoto, Kyoto (JP); Zempachi Ogumi, Kyoto (JP); Takeshi Abe, Takatsuki (JP)

(73) Assignees: TOYOTA JIDOSHA KABUSHIKI KAISHA, Toyota (JP); KYOTO UNIVERSITY, Kyoto (JP)

( * ) Notice: Subject to any disclaimer, the term of this patent is extended or adjusted under 35 U.S.C. 154(b) by 392 days.

(21) Appl. No.: 15/252,693

(22) Filed: Aug. 31, 2016

(65) Prior Publication Data
US 2017/0077521 A1 Mar. 16, 2017

(30) Foreign Application Priority Data
Sep. 10, 2015 (JP) .............................. JP2015-178585

(51) Int. Cl.
| H01M 4/66 | (2006.01) |
| H01M 10/05 | (2010.01) |
| H01M 4/38 | (2006.01) |
| H01M 10/0569 | (2010.01) |
| H01M 10/0568 | (2010.01) |
| H01M 4/58 | (2010.01) |
| H01M 4/583 | (2010.01) |

(52) U.S. Cl.
CPC ............. *H01M 4/661* (2013.01); *H01M 4/38* (2013.01); *H01M 4/381* (2013.01); *H01M 4/58* (2013.01); *H01M 4/662* (2013.01); *H01M 4/669* (2013.01); *H01M 10/05* (2013.01); *H01M 10/0568* (2013.01); *H01M 10/0569* (2013.01); *H01M 4/5835* (2013.01); *H01M 2300/0025* (2013.01); *H01M 2300/0028* (2013.01)

(58) Field of Classification Search
CPC ........ H01M 4/661; H01M 4/38; H01M 4/381; H01M 4/58; H01M 4/662; H01M 10/05; H01M 2300/0025
See application file for complete search history.

(56) References Cited

U.S. PATENT DOCUMENTS

| 5,443,930 A | 8/1995 | Shoji et al. | |
| 5,542,163 A * | 8/1996 | Chang ..................... | H01M 4/02 29/2 |
| 2005/0112469 A1* | 5/2005 | Goto ..................... | H01M 4/134 429/233 |

(Continued)

FOREIGN PATENT DOCUMENTS

| CN | 101558518 A | 10/2009 |
| CN | 102106025 A | 6/2011 |

(Continued)

*Primary Examiner* — Eugenia Wang
(74) *Attorney, Agent, or Firm* — Oliff PLC (57) ABSTRACT

A main object of the present invention is to provide an anode current collector that is capable of inhibiting the reaction with liquid electrolyte. The present invention achieves the object by providing an anode current collector to be used for a fluoride ion battery; and the anode current collector being a simple substance of Fe, Mg, or Ti, or an alloy containing one or more of these metal elements.

13 Claims, 2 Drawing Sheets

(56) References Cited

U.S. PATENT DOCUMENTS

| | | | |
|---|---|---|---|
| 2006/0269834 A1 | 11/2006 | West et al. | |
| 2010/0021800 A1 | 1/2010 | Yazami et al. | |
| 2010/0035155 A1 | 2/2010 | Okada et al. | |
| 2011/0143219 A1* | 6/2011 | Weiss ................. | H01M 4/5835 |
| | | | 429/338 |
| 2012/0164541 A1 | 6/2012 | Darolles et al. | |
| 2013/0048924 A1 | 2/2013 | Amatucci et al. | |
| 2016/0336598 A1* | 11/2016 | Yazami ................ | H01M 4/622 |
| 2017/0033359 A1 | 2/2017 | Ogumi et al. | |

FOREIGN PATENT DOCUMENTS

| | | | |
|---|---|---|---|
| CN | 102754257 A | 10/2012 | |
| JP | H05-325973 A | 12/1993 | |
| JP | H07-50165 A | 2/1995 | |
| JP | 2008-543002 A | 11/2008 | |
| JP | 2013-510409 A | 3/2013 | |
| JP | 2013-084496 A | 5/2013 | |
| JP | 2014-501434 A | 1/2014 | |
| JP | 2014-157801 A | 8/2014 | |
| JP | 2015-125934 A | 7/2015 | |
| KR | 2014-0105871 A | 9/2014 | |
| WO | 2007-146453 A2 | 12/2007 | |
| WO | 2010/036448 A2 | 4/2010 | |
| WO | 2011/057263 A1 | 5/2011 | |
| WO | WO-2015108486 A1 * | 7/2015 | ............ H01M 4/623 |

\* cited by examiner

ANODE CURRENT COLLECTOR, CONDUCTIVE MATERIAL, AND FLUORIDE ION BATTERY

TECHNICAL FIELD

The present invention relates to an anode current collector that can inhibit the reaction with liquid electrolyte.

BACKGROUND ART

For example, a Li ion battery is known as a high-voltage and high-energy density battery. The Li ion battery is a cation-based battery utilizing a reaction between a Li ion and a cathode active material and a reaction between a Li ion and an anode active material. Meanwhile, as an anion-based battery, a fluoride ion battery utilizing a reaction of a fluoride ion is known.

Also, a battery utilizing reactions of both a Li ion and a fluoride ion is known. For example, Patent Literature 1 discloses a Li ion battery including a carbonic cathode, LiF salt, and a non-aqueous electrolyte solution containing an anion receptor that connects to a fluoride ion. Further, it is described that this battery may be a dual intercalation electrode Li ion battery, and it is described that each electrode reversibly intercalate the ion supplied by LiF salt. Also, with regard to examples of the materials for a current collector, copper, silver, gold, platinum, nickel, cobalt, palladium, aluminum, or those alloy are disclosed.

Meanwhile, Patent Literature 2 disclosed a fluoride ion battery comprising an anode, a cathode, an electrolyte including a fluoride salt that is at least partially dissolved in a solvent, and an additive including a fluoride composite producing seed. Incidentally, specific example of the current collector is not described in Patent Literature 2.

CITATION LIST

Patent Literatures

Patent Literature 1: Japanese Patent Application Laid-Open (JP-A) No. 2008-543002
Patent Literature 2: JP-A No. 2014-501434

SUMMARY OF INVENTION

Technical Problem

For example, in paragraphs [0013] and [0067] in Patent Literature 1, it is disclosed that Cu is used for an anode current collector. However, usage of Cu for an anode current collector in a fluoride ion battery arise a new problem that the reaction with a liquid electrolyte is caused at relatively high potential.

The present invention was made in a nod to the circumstances and a main object thereof is to provide an anode current collector that is capable of inhibiting the reaction with a liquid electrolyte.

Solution to Problem

In order to achieve the object, the inventors have been researched as hard as possible and found out that the potential, at which the reaction with the liquid electrolyte occurs, increases in accordance with kinds of a metal to be used for an anode current collector. Above all, it was found out that the potential, at which the reaction with the liquid electrolyte occurs, significantly decreases when a specific metal is used for an anode current collector, and the present invention was achieved consequently.

Namely, the present invention provides an anode current collector to be used for a fluoride ion battery, and the anode current collector is a simple substance of Fe, Mg, or Ti, or an alloy containing one or more of these metal elements.

According to the present invention, usage of the specific metal allows an anode current collector to be capable of inhibiting the reaction with the liquid electrolyte.

In the invention, the anode current collector is preferably a simple substance of Fe, or an alloy containing Fe.

In the invention, the alloy containing Fe is preferably a stainless steel.

Also, the present invention provides a conductive material to be used for a fluoride ion battery, the conductive material comprising a simple substance of Fe, Mg, or Ti, or an alloy containing one or more of these metal elements.

According to the present invention, usage of the specific metal allows a conductive material to be capable of inhibiting the reaction with the liquid electrolyte.

Also, the present invention provides a fluoride ion battery comprising a cathode active material layer containing a cathode active material, an anode active material layer containing an anode active material, an electrolyte layer formed between the cathode active material layer and the anode active material layer, a cathode current collector for collecting currents of the cathode active material layer, and an anode current collector for collecting currents of the anode active material layer, wherein the anode current collector is the anode current collector described above.

According to the present invention, usage of the above described anode current collector allows a fluoride ion battery to be capable of inhibiting reaction with the liquid electrolyte. Accordingly, improvement of the coulomb efficiency may be achieved, for example.

Also, the present invention may provide a fluoride ion battery comprising a cathode active material layer containing a cathode active material, an anode active material layer containing an anode active material, an electrolyte layer formed between the cathode active material layer and the anode active material layer, a cathode current collector for collecting currents of the cathode active material layer and an anode current collector for collecting currents of the anode active material layer, wherein at least one of the cathode active material layer and the anode active material layer contains the conductive material described above.

According to the present invention, usage of the above-described conductive material allows a fluoride ion battery to be capable of inhibiting reaction with the liquid electrolyte. Accordingly, improvement of the coulomb efficiency may be achieved, for example.

Advantageous Effects of Invention

An anode current collector of the present invention exhibits an effect that can inhibit the reaction with the liquid electrolyte.

DESCRIPTION OF EMBODIMENTS

An anode current collector, a conductive material, and a fluoride ion battery of the present invention are hereinafter described in detail.

A. Anode Current Collector

An anode current collector of the present invention is the anode current collector to be used for a fluoride ion battery, and the anode current collector is a simple substance of Fe, Mg, or Ti, or an alloy containing one or more of these metal elements.

According to the present invention, usage of the specific metal allows the anode current collector to be capable of inhibiting the reaction with the liquid electrolyte. Here, the liquid electrolyte to be used for a fluoride ion battery usually has fluoride anion conductivity. "Fluoride anion conductivity" refers to the ion conductivity in regard to fluoride ions in a broad sense. In terms of fluoride ions, an ion is not conducted well independently and is conducted as a fluoride anion (such as a fluoride complex anion) in some cases. Accordingly, the term fluoride anion conductivity is used in the present invention. Also, a fluoride is an element with the highest electric negativity among all elements, and the fluoride anion that is the anion of such fluoride has significantly high reactivity. As shown in the later described Examples, each element of Fe, Mg, and Ti is stable to the fluoride anion contained in the liquid electrolyte under reduction atmosphere so that the reaction with the liquid electrolyte may be inhibited.

Also, in terms of lithium ion batteries for example, Cu is used as a typical anode current collector. However, when Cu is used as an anode current collector in a fluoride ion battery, the reaction with the liquid electrolyte occurs at high potential which is about 1 V vs. Li/Li$^+$. The reaction of the anode current collector and the liquid electrolyte is not the objected reaction (fluoridation and defluoridation of the anode active material), but is the side reaction. It is presumed that the occurrence of the side reaction leads to decrease in coulomb efficiency of a battery and to malfunctioning as a battery. On the contrary, the anode current collector of the present invention is stable to the liquid electrolyte until the potential becomes 0.2 V vs. Li/Li$^+$ or less, for example. Accordingly, the anode current collector of the present invention is easily used with an anode active material with low reaction potential. Usage of an anode active material with low reaction potential allows comparatively large potential difference between a cathode active material and an anode active material, and thus a fluoride ion battery with high voltage may be obtained. Also, undesirable outcomes such as decrease in coulomb efficiency of a battery may be restrained.

Also, for example, an anode active material containing a Ce element, an Mg element or a Ca element is an anode active material with high capacity. The theoretical potential of sCe/CeF$_3$ reaction is 0.45 V vs. Li/Li$^+$, the theoretical potential of Mg/MgF$_2$ reaction is 0.28 V vs. Li/Li$^-$, and the theoretical potential of Ca/CaF$_2$ reaction is −0.23 V vs. Li/Li$^+$. Accordingly, a fluoride ion with high capacity may be obtained by using these anode active materials along with the anode current collector of the present invention. Incidentally, the theoretical potential of Li/LiF reaction is −0.27 V vs. Li/Li$^+$. In consideration of these theoretical potentials and excessive voltage (difference between the theoretical potential and the potential at which the reaction actually occurs), the anode current collector is preferably stable to the liquid electrolyte until the potential becomes 0.4 V vs. Li/Li$^+$ or less for example, and is more preferably stable to the liquid electrolyte until the potential becomes 0.2 V vs. Li/Li$^+$ or less.

Incidentally, the anode current collector that is a simple substance of Fe, Mg, or Ti, or an alloy containing one or more of these metal elements, is possibly a material known in the fields such as the field of lithium ion batteries. However, as described above, a fluoride anion has significantly high reactivity. In the field of fluoride ion batteries, whether a liquid electrolyte reacts with an anode current collector, and about what potential the liquid electrolyte reacts with the anode current collector at are not known. In the present invention, it was found out that the potential, at which the reaction with the liquid electrolyte occurs, greatly differs in accordance with the kind of a metal to be used for an anode current collector, and found out that the potential, at which the reaction with the liquid electrolyte occurs, is significantly decreased when the specific metal is used as the anode current collector.

The anode current collector in the present invention is usually a simple substance of Fe, Mg, or Ti, or an alloy containing one or more of these metal elements. The alloy is an alloy containing an Me element (Me is at least one of Fe, Mg, and Ti). An Me element may be one kind, may be two kinds, and may be three kinds. Also, the alloy may be an alloy constituted with just an Me element, and may be an alloy further containing one kind or two or more kinds of other elements. Examples of the other elements may include a C element, a Si element, a Mn element, a P element, a S element, a Ni element, a Cr element, a Mo element, a Cu element, a N element, an Al element, a Zn element, a Li element, a Ca element, a Sn element, and a V element.

Specific examples of the alloy may include an alloy containing an Fe element, an alloy containing a Mg element, an alloy containing a Ti element, an alloy containing an Fe element and a Mg element, an alloy containing an Fe element and a Ti element, an alloy containing a Mg element and a Ti element, an alloy containing an Fe element, a Mg element and a Ti element. Incidentally, as described above, these alloys may be an alloy constituted with just an Me element and may be an alloy further containing other elements.

Examples of the alloy containing an Fe element may include stainless steel. Examples of the alloy containing a Mg element may include a calcium magnesium alloy, and an aluminum magnesium alloy (a lithium aluminum magnesium alloy, an aluminum zinc magnesium alloy). Examples of the alloy containing a Ti element may include an aluminum titanium alloy (an aluminum vanadium titanium alloy, an aluminum chromium titanium alloy, and an aluminum tin titanium alloy).

The ratio of an Me element in the whole anode current collector (whole alloy) may be 1% by weight or more for example, may be 5% by weight or more, and may be 10% by weight or more. On the other hand, the ratio of an Me element in the whole anode current collector (whole alloy) is 100% by weight at the maximum. Also, the anode current collector in the present invention may contain an Me element as the main component. In this case, the ratio of an Me element in the whole alloy is 50% by weight or more for example, may be 70% by weight or more, and may be 90% by weight or more. On the other hand, the anode current collector in the present invention may contain other element than an Me element as the main component. In this case, the ratio of the other element in the whole alloy is 50% by weight or more for example, may be 70% by weight or more, and may be 90% by weight or more.

Examples of the shape of the anode current collector may include a foil shape, a mesh shape, a porous shape, and a sponge shape. Also, the thickness of the anode current collector is not particularly limited, but is preferably thin in the view point of the battery capacity improvement. Also, the anode current collector may be disposed in arbitrary place to collect currents of the anode active material layer. The anode current collector is usually used for a fluoride ion battery.

B. Conductive Material

The conductive material of the present invention is a conductive material to be used for a fluoride ion battery, and comprises a simple substance of Fe, Mg, or Ti, or an alloy containing one or more of these metal elements.

According to the present invention, usage of the specific metal allows the conductive material to be capable of inhibiting the reaction with the liquid electrolyte. The contents of the conductive material of the present invention are basically the same as described in "A. Anode current collector", thus the description herein is omitted. Meanwhile, examples of the shape of the conductive material may include a foil shape, a mesh shape, a porous shape, and a sponge shape. For example, if the conductive material is in a granular shape, an electrode may be obtained by preparing the electrode mixture containing at least the conductive material and active material, and then coating the current collector with the electrode mixture. Also, for example, if the conductive material is in a mesh shape, porous shape, or sponge shape, the conductive material may also function as the current collector.

C. Fluoride Ion Battery

Figure 1:
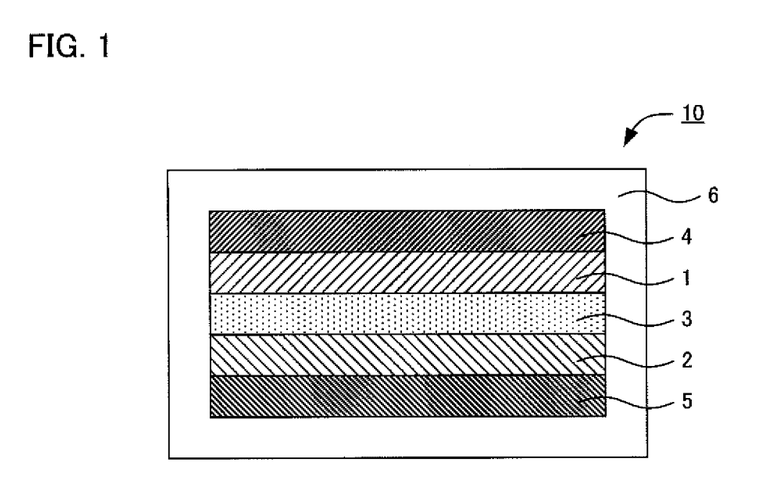
FIG. 1 is a schematic cross-sectional view showing an example of a fluoride ion battery of the present invention.

FIG. 1 is a schematic cross-sectional view illustrating an example of a fluoride ion battery of the present invention. The fluoride ion battery 10 shown in FIG. 1 has a cathode active material layer 1 containing a cathode active material, an anode active material layer 2 containing an anode active material, an electrolyte layer 3 formed between the cathode active material layer 1 and the anode active material layer 2, a cathode current collector 4 for collecting currents of the cathode active material layer 1, an anode current collector 5 for collecting currents of the anode active material layer 2, and a battery case 6 for storing these members. The present invention features the configuration in which the above described anode current collector is used as the anode current collector 5. Alternatively, the present invention features the configuration in which at least one of the cathode active material layer 1 and the anode active material layer 2 contains the conductive material described above.

According to the present invention, usage of the above described anode current collector or conductive material allows a fluoride ion battery in which the reaction with the liquid electrolyte is inhibited. Accordingly, for example, improvement of the coulomb efficiency may be achieved.

The fluoride ion battery of the present invention is hereinafter described in each constitution.

1. Anode

The fluoride ion battery of the present invention has an anode active material layer, and an anode current collector for collecting currents of the anode active material layer. The anode active material layer is a layer containing at least an anode active material. Also, the anode active material layer may further contain at least one of a conductive material and a binder other than the anode active material.

The anode active material in the present invention is usually an active material that is fluorinated at the time of discharging. Also, arbitrary active material that has lower potential than that of the cathode active material may be selected for the anode active material. Accordingly, the later described cathode active material may be used as the anode active material. Examples of the anode active materials may include a simple substance of metal, an alloy, a metal oxide, and fluorides of these. Examples of the metal elements contained in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Above all, the anode active material is preferably La, $LaF_x$, Co, $CoF_x$, Mg, $MgF_x$, Ca, $CaF_x$, Al, and $AlF_x$. Incidentally, the "x" is a real number that is larger than 0.

The theoretical potential (V vs. $Li/Li^-$) of $M/MF_x$ reaction in the anode active material (M) is 1 V or less for example, may be 0.5 V or less, and may be 0.3 V or less. The fluoride ion battery with high voltage may be obtained by using the anode active material with low potential. On the other hand, the theoretical potential (V vs. $Li/Li^+$) of $M/MF_x$ reaction in the anode active material (M) is −1.0 V or more for example. Also, the theoretical potential of $M/MF_x$ reaction in the anode active material (M) is preferably higher than the potential at which the anode current collector reacts with the liquid electrolyte.

The conductive material is not particularly limited if the material has the desired electric conductivity, but examples thereof may include carbon materials and metal materials. Examples of the carbon materials may include carbon blacks such as acetylene black, Ketjen black, furnace black, and thermal black; graphene, fullerene, and carbon nanotube. Examples of the metal materials may include the same materials for above described anode current collector. In particular, the conductive material described in "B. Conductive material" above is preferably used. Also, if the anode active material layer contains the conductive material described in "B. Conductive material" above, the anode active material layer may or may not contain a carbon material as the conductive material. On the other hand, the binder is not particularly limited if it is chemically and electrically stable, but examples thereof may include fluoride-based binders such as polyvinylidene fluoride (PVDF), and polytetrafluoroethylene (PTFE), hydrocarbon-based binders such as polyimide, and silicon-based binders.

Also, the content of the anode active material in the anode active material layer is preferably larger in the view point of the capacity; the content is 30% by weight or more for example, preferably 50% by weight or more, and more preferably 70% by weight or more. Also, the thickness of the anode active material layer varies greatly in accordance with the constitutions of the batteries, and not particularly limited.

Meanwhile, the fluoride ion battery of the present invention has an anode current collector for collecting currents of the anode active material layer. The anode current collector is in the same contents as the description in 'A. Anode current collector' above. Also, the anode current collector may be used as the anode active material at the same time. In other words, the anode active material may be used as the anode current collector. On the contrary, the anode current collector and the anode active material may be different members. In this case, the material for the anode current collector and the material for the anode active material may be the same and may be different.

2. Electrolyte Layer

The electrolyte layer in the present invention is a layer formed between a cathode active material layer and an anode active material layer. The electrolyte material that constitutes the electrolyte layer may be an electrolyte solution (a liquid electrolyte), and may be a solid electrolyte material.

The liquid electrolyte in the present invention contains a fluoride salt and an organic solvent, for examples. The fluoride salt is not particularly limited if it generates a fluoride ion that reacts with an active material, and may be an inorganic fluoride salt and may be an organic fluoride salt. Also, the fluoride salt may be an ionic solution. Examples of the inorganic fluoride salt may include XF (X is Li, Na, K, Rb, or Cs).

Examples of the cation of the organic fluoride salt may include alkyl ammonium cation, alkyl phosphonium cation, and alkyl sulfonium cation. Examples of the alkyl ammonium cation may include cations represented by $N^+(R^1R^2R^3R^4)$. Incidentally, $R^1$ to $R^4$ is each independently an alkyl group or a fluoro alkyl group. The carbon number of $R^1$ to $R^4$ is usually 10 or less. Typical examples of the alkyl ammonium cation may include tetramethyl ammonium cation.

The concentration of the fluoride salt in the liquid electrolyte is within a range of 0.1 mol % to 40 mol % for example, and preferably within a range of 1 mol % to 10 mol %.

An organic solvent for the liquid electrolyte is usually a solvent that dissolves the fluoride salt. An example of the organic solvent is a glyme represented by the general formula $R^1$—$O(CH_2CH_2O)_n$—$R^2$ ($R^1$ and $R^2$ are each independently an alkyl group with carbon number of 4 or less, or a fluoro alkyl group with carbon number of 4 or less, and "n" is within a range of 2 to 10).

Specific examples of the glyme may include diethylene glycol diethyl ether (G2), tri-ethylene glycol dimethyl ether (G3), tetra-ethylene glycol dimethyl ether (G4), diethylene glycol dibutyl ether, diethylene glycol methyl ethyl ether, tri-ethylene glycol methyl ethyl ether, and tri-ethylene glycol butyl methyl ether.

Other examples of the organic solvent may include non-aqueous solvent. Examples of the non-aqueous solvent may include cyclic carbonates such as ethylene carbonate (EC), fluoro ethylene carbonate (FEC), difluoro ethylene carbonate (DFEC), propylene carbonate (PC), and butylene carbonate (BC), and chain carbonates such as dimethyl carbonate (DMC), diethyl carbonate (DEC), and ethyl methyl carbonate (EMC). Also, an ionic solution may be used as the organic solvent.

The liquid electrolyte in the present invention may be constituted with just the fluoride salt and the organic solvent, and may further contain other chemical compounds. Examples of the other chemical compounds may include Li amid salt having Li ion and sulfonyl amid anion. Sulfonyl amid anion is an anion in which N in amid anion (anion centered) and S in sulfonyl group are bonded. Examples of the sulfonyl amid anion may include bisfluoro sulfonyl amid (FSA) anion, and bistrifuloro methane sulfonyl amid (TFSA) anion. Another example of the other chemical compounds is a complex chemical compound containing Li ion and fluoride complex anion. Examples of the fluoride complex anion may include $PF_6^-$, $BF_4^-$, and $(C_2F_5)_3PF_3^-$. Incidentally, the liquid electrolyte in the present invention preferably contains the inorganic fluoride salt, at least one of Li amid salt and complex chemical compound, and the glyme, as in the later described Examples.

Meanwhile, examples of the solid electrolyte material may include a fluoride of a lanthanoid element such as La and Ce, a fluoride of an alkali element such as Li, Na, K, Rb, and Cs, and a fluoride of an alkali earth element such as Ca, Sr, and Ba.

Also, the thickness of the electrolyte layer in the present invention varies greatly in accordance with the constitution of the battery, and not particularly limited.

3. Cathode

The fluoride ion battery of the present invention has a cathode active material layer, and a cathode current collector for collecting currents of the cathode active material layer. The cathode active material layer is a layer containing at least a cathode active material. Also, the cathode active material layer may further contain at least one of a conductive material and a binder other than the cathode active material.

The cathode active material in the present invention is usually an active material that is defluorinated at the time of discharging. Examples of the cathode active material may include a simple substance of metal, an alloy, a metal oxide and the fluorides of these. Examples of the metal element to be contained in the cathode active material may include Cu, Ag, Ni, Co, Pb, Ce, Mn, Au, Pt, Rh, V, Os, Ru, Fe, Cr, Bi, Nb, Sb, Ti, Sn, and Zn. Above all, the cathode active material is preferably Cu, CuFx, Pb, PbFx, Bi, BiFx, Ag, and AgFx. Incidentally, the "x" is a real number larger than 0. Also, other examples of the cathode active material may include carbon materials and the fluorides thereof. Examples of the carbon materials may include graphite, coke, and carbon nano tube. Also, another example of the cathode active material is a polymer material. Examples of the polymer material may include polyaniline, polypyrrole, polyacetylene, and polythiophene. Incidentally, the above described carbon materials and polymer materials may be used as the anode active material.

The same materials as the descriptions in '1. Anode' above may be used as the conductive material and the binder. Also, the content of the cathode active material in the cathode active material layer is preferably larger in the view point of the capacity, and is 30% by weight or more for example, preferably 50% by weight or more, and more preferably 70% by weight or more. Also, the thickness of the cathode active material layer varies greatly in accordance with the constitution of the battery, and is not particularly limited.

Meanwhile, the fluoride ion battery of the present invention has a cathode current collector for collecting currents of the cathode active material layer. Materials to be used for the cathode current collector are not particularly limited. Also, the cathode current collector may be used as the cathode active material at the same time. In other words, the cathode active material may be used as the cathode current collector. On the contrary, the cathode current collector may be a different member from that of the cathode active material. In this case, the material for the cathode current collector and the material for the cathode active material may be the same and may be different.

4. Other Constitutions

The fluoride ion battery of the present invention has the above described anode active material layer, anode current collector, electrolyte layer, cathode active material layer, and cathode current collector. Also, the fluoride ion battery of the present invention may have a separator between the cathode active material layer and the anode active material layer. The reason therefor is to obtain a battery with even higher safety.

5. Fluoride Ion Battery

The fluoride ion battery of the present invention may be a primary battery or a secondary battery, but preferably a secondary battery among them. The reason therefor is to be repeatedly charged and discharged and be useful as a car-mounted battery for example. Incidentally, the primary battery includes a usage of a secondary battery as a primary battery (use for the purpose of just one time discharge after charging). Also, examples of the shape of the fluoride ion battery of the present invention may include a coin shape, a laminate shape, a cylindrical shape, and a rectangular shape.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described in more details with reference to examples hereinafter. Incidentally, all the measurement samples were produced in a glove box under Ar atmosphere.

Example 1

An Fe plate (99.99% purity, manufactured by The Nilaco Corporation) was prepared as the measurement sample. Meanwhile, the liquid electrolyte was obtained by mixing tetra-glyme (G4, manufactured by Kishida Chemical Co., Ltd.) with lithium bisfluoro sulfonyl amide (Li-FSA, manufactured by Kishida Chemical Co., Ltd.) and cesium fluoride (CsF, manufactured by KANTO CHEMICAL CO., INC.) so as to be 4.5 M and 0.45 M respectively, and then stirring the mixture in a sealed vessel made of fluoride resin under the condition of 30° C. In this manner, the measurement sample and the liquid electrolyte were prepared.

Example 2

The measurement sample and the liquid electrolyte were prepared in the same manner as in Example 1 except that an Mg ribbon (99.9% purity, manufactured by The Nilaco Corporation) was used as the measurement sample.

Comparative Example 1

The measurement sample and the liquid electrolyte were prepared in the same manner as in Example 1 except that a Cu plate (99.96% purity, manufactured by The Nilaco Corporation) was used as the measurement sample.

Comparative Example 2

The measurement sample and the liquid electrolyte were prepared in the same manner as in Example 1 except that a Pb plate (99.99% purity, manufactured by The Nilaco Corporation) was used as the measurement sample.

Comparative Example 3

The measurement sample and the liquid electrolyte were prepared in the same manner as in Example 1 except that a Pt plate (99.98% purity, manufactured by The Nilaco Corporation) was used as the measurement sample.

Comparative Example 4

The measurement sample and the liquid electrolyte were prepared in the same manner as in Example 1 except that a Sn plate (99.9% purity, manufactured by The Nilaco Corporation) was used as the measurement sample.

Comparative Example 5

The measurement sample and the liquid electrolyte were prepared in the same manner as in Example 1 except that a Zn plate (99.5% purity, manufactured by The Nilaco Corporation) was used as the measurement sample.

Example 3

An Fe plate (99.99% purity, manufactured by The Nilaco Corporation) was prepared as the measurement sample. Meanwhile, the liquid electrolyte was obtained by mixing tri-glyme (G3, manufactured by KANTO CHEMICAL CO., INC.) with lithium hexafluoro phosphate ($LiPF_6$, manufactured by Kishida Chemical Co., Ltd.) and lithium fluoride (LiF, manufactured by Wako Pure Chemical Industries, Ltd.) so as to be molar ratio of $G3:LiPF_6:LiF=20:5:1$, and then stirring the mixture in a sealed vessel made of fluoride resin under the condition of 30° C. In this manner, the measurement sample and the liquid electrolyte were prepared.

Example 4

The measurement sample and the liquid electrolyte were prepared in the same manner as in Example 3 except that an Mg ribbon (99.9% purity, manufactured by The Nilaco Corporation) was used as the measurement sample.

Example 5

The measurement sample and the liquid electrolyte were prepared in the same manner as in Example 3 except that a SUS304 plate (manufactured by The Nilaco Corporation) was used as the measurement sample.

Comparative Example 6

The measurement sample and the liquid electrolyte were prepared in the same manner as in Example 3 except that a Cu plate (99.96% purity, manufactured by The Nilaco Corporation) was used as the measurement sample.

Comparative Example 7

The measurement sample and the liquid electrolyte were prepared in the same manner as in Example 3 except that a Pt plate (99.98% purity, manufactured by The Nilaco Corporation) was used as the measurement sample.

Example 6

An Mg ribbon (99.9% purity, manufactured by The Nilaco Corporation) was prepared as the measurement sample. Meanwhile, the liquid electrolyte was obtained by mixing propylene carbonate (PC, manufactured by Kishida Chemical Co., Ltd.) with lithium hexafluoro phosphate ($LiPF_6$, manufactured by Kishida Chemical Co., Ltd.) and lithium fluoride (LiF, manufactured by Wako Pure Chemical Industries, Ltd.) so as to be molar ratio of $PC:LiPF_6:LiF=20:5:1$, and then stirring the mixture in a sealed vessel made of fluoride resin under the condition of 30° C. In this manner, the measurement sample and the liquid electrolyte were prepared.

Example 7

The measurement sample and the liquid electrolyte were prepared in the same manner as in Example 6 except that a SUS304 plate (manufactured by The Nilaco Corporation) was used as the measurement sample.

Example 8

The measurement sample and the liquid electrolyte were prepared in the same manner as in Example 6 except that a Ti plate (99.5% purity, manufactured by The Nilaco Corporation) was used as the measurement sample.

[Evaluation]
(Chronopotentiometry Measurement)

Chronopotentiometry (CP) measurement was conducted for the measurement samples of Examples 1 to 8 and Comparative Examples 1 to 7, in each liquid electrolyte. Specifically, the measurement samples were evaluated by using a dip-style three electrodes cell in a glove box which was under Ar atmosphere. The measurement sample was used for the acting electrode, and the mixture electrode of PTFE, acetylene black (AB), and carbon fluoride was used for the counter electrode. Incidentally, the mixture electrode was the electrode containing the mixture at the weight ratio of PTFE:AB:carbon fluoride=1:2:7. Also, the reference electrode was isolated from the liquid electrolyte by using Vycor™ glass. Incidentally, used reference electrode was such that an Ag line was soaked in acetonitrile solution, in which silver nitrate and tetrabutyl ammonium perchlorate were dissolved respectively at 0.1 M. Also, the measurement was conducted at room temperature, and the potential with the electricity amount of −0.01 mAh/cm$^2$ was measured.

Figure 2:
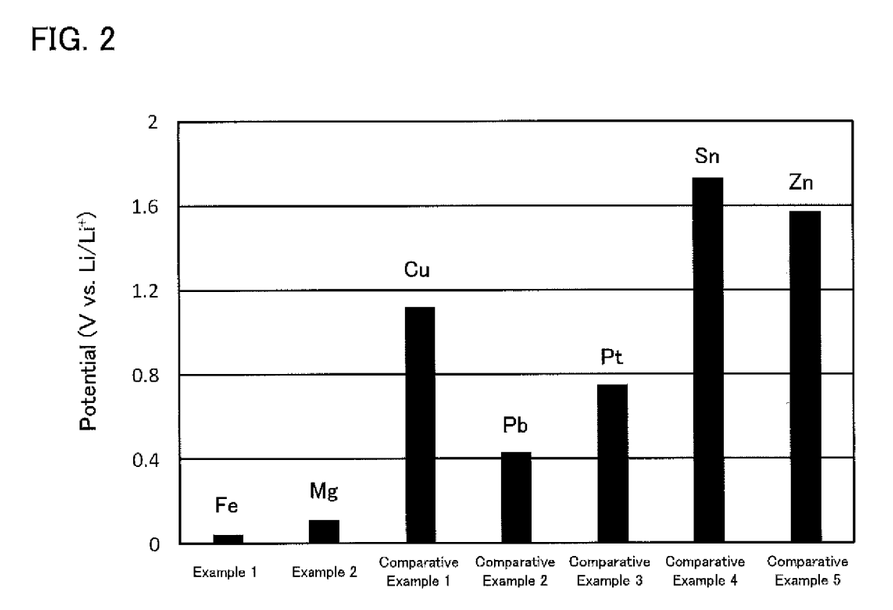
FIG. 2 is the results of CP measurement for the measurement samples in Examples 1, 2 and Comparative Examples 1 to 5.

First, the results of Examples 1, 2 and Comparative Examples 1 to 5 are shown in Table 1 and FIG. 2.

TABLE 1

| | Measurement sample | Liquid electrolyte | Potential (V vs. Li/Li$^+$) |
|---|---|---|---|
| Example 1 | Fe | CsF + Li—FSA + G4 | 0.04 |
| Example 2 | Mg | | 0.11 |
| Comparative Example 1 | Cu | | 1.12 |
| Comparative Example 2 | Pb | | 0.43 |
| Comparative Example 3 | Pt | | 0.75 |
| Comparative Example 4 | Sn | | 1.73 |
| Comparative Example 5 | Zn | | 1.57 |

As shown in Table 1 and FIG. 2, the reaction with the liquid electrolyte was seen at high potential of 1 V or more in Comparative Example 1 (Cu). On the other hand, the reaction with the liquid electrolyte could not be seen until the potential of 0.2 V or less in Example 1 (Fe) and Example 2 (Mg). Consequently, it was suggested that the anode current collector of the present invention may be easily used with the anode active material with low reaction potential. Incidentally, the resistance becomes lower (becomes stable at less noble potential) if the measurement sample does not react with the liquid electrolyte. Therefore, it can be said that the less the potential becomes, the more excellent the anode current collector becomes.

Figure 3:
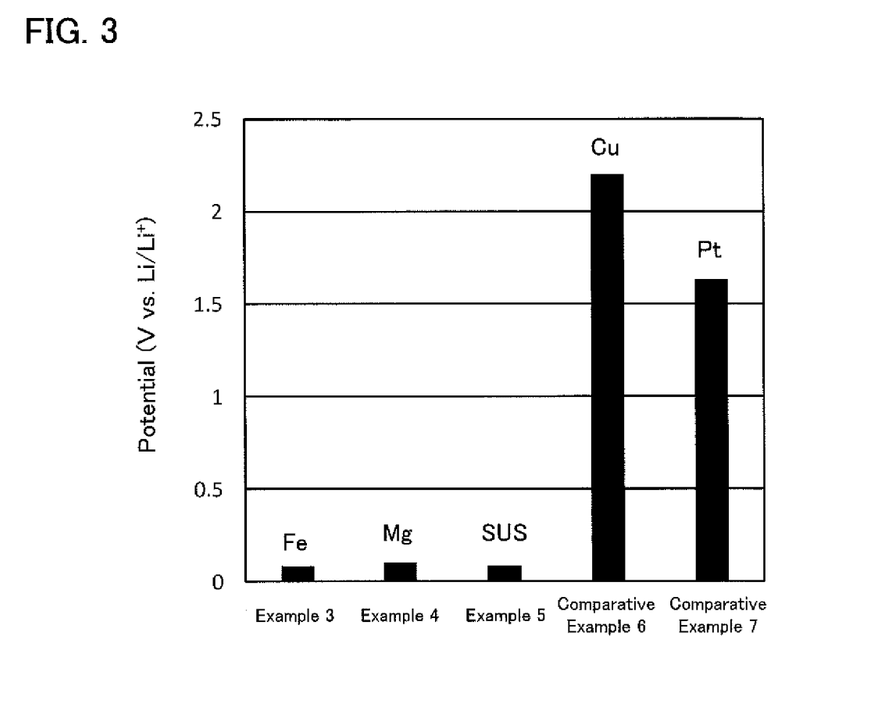
FIG. 3 is the results of CP measurement for the measurement samples in Examples 3 to 5 and Comparative Examples 6 and 7.

Next, the results of Examples 3 to 5, Comparative Examples 6 and 7 are shown in Table 2 and FIG. 3.

TABLE 2

| | Measurement sample | Liquid electrolyte | Potential (V vs. Li/Li$^+$) |
|---|---|---|---|
| Example 3 | Fe | LiF + LiPF$_6$ + G3 | 0.08 |
| Example 4 | Mg | | 0.1 |
| Example 5 | SUS304 | | 0.08 |
| Comparative Example 6 | Cu | | 2.2 |
| Comparative Example 7 | Pt | | 1.63 |

As shown in Table 2 and FIG. 3, the reaction with the liquid electrolyte at high potential of 1 V or more was seen in Comparative Example 6 (Cu) and Comparative Example 7 (Pt), but the reaction with the liquid electrolyte was not seen until 0.1 V or less in Example 3 (Fe), Example 4 (Mg), and Example 5 (SUS). Consequently, it was suggested that the anode current collector of the present invention may be easily used with the anode active material with low reaction potential. Also, the measurement samples of Example 3 (Fe) and Example 4 (Mg) were the same as those of Example 1 (Fe) and Example 2 (Mg) respectively. Accordingly, the same effect was obtained even with the different constituent components (salt component) for the liquid electrolyte. Also, the measurement sample in Example 3 (Fe) was a simple substance of Fe, and the measurement sample in Example 5 (SUS) was an alloy containing Fe; it was suggested that either form is useful as an anode current collector.

Figure 4:
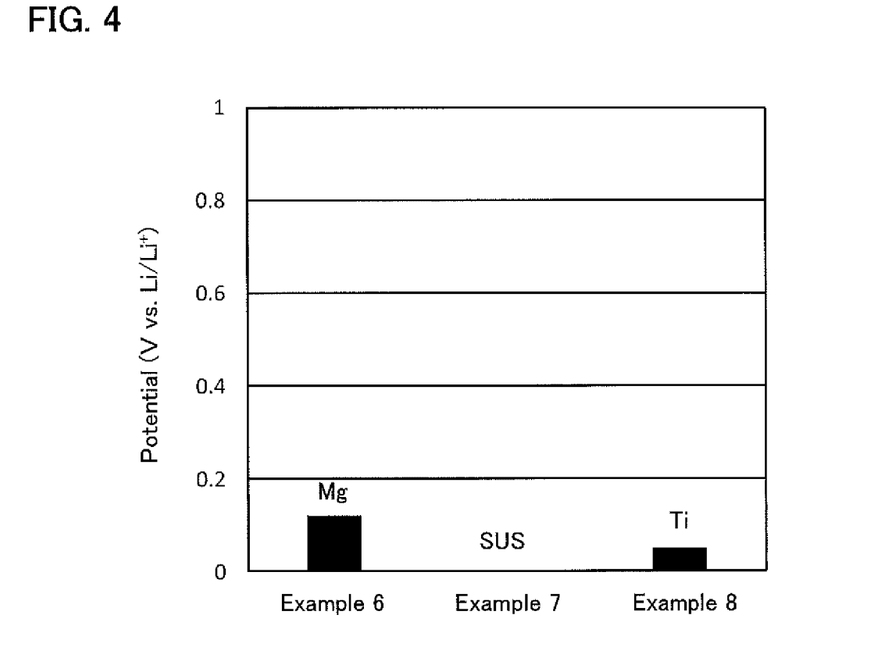
FIG. 4 is the results of CP measurement for the measurement samples in Examples 6 to 8.

Next, the results of Examples 6 to 8 are shown in Table 3 and FIG. 4.

TABLE 3

| | Measurement sample | Liquid electrolyte | Potential (V vs. Li/Li$^+$) |
|---|---|---|---|
| Example 6 | Mg | LiF + LiPF$_6$ + PC | 0.12 |
| Example 7 | SUS304 | | 0 |
| Example 8 | Ti | | 0.05 |

As shown in Table 3 and FIG. 4, the reaction with the liquid electrolyte was not seen until the potential of 0.1 V or less in Example 6 (Mg), Example 7 (SUS), and Example 8 (Ti). Consequently, it was suggested that the anode current collector of the present invention may be easily used with the anode active material with low reaction potential. Especially in Example 7 (SUS), the reaction with the liquid electrolyte was not seen even at 0 V. Also, the measurement samples of Example 6 (Mg) and Example 7 (SUS) were the same as those of Example 4 (Mg) and Example 5 (SUS) respectively. Therefore, the same effect was obtained even with the different constituent component (solvent component) for the liquid electrolyte.

REFERENCE SIGNS LIST

1 cathode active material layer
2 anode active material layer
3 electrolyte layer
4 cathode current collector 5 anode current collector
6 battery case
10 fluoride ion battery

What is claimed is:

1. A fluoride ion battery comprising a cathode active material layer comprising a cathode active material, an anode active material layer comprising an anode active material, a liquid electrolyte layer formed between the cathode active material layer and the anode active material layer, a cathode current collector for collecting currents of the cathode active material layer and an anode current collector for collecting currents of the anode active material layer,
wherein the anode current collector is a simple substance of Fe.

2. The fluoride ion battery according to claim 1, wherein the anode current collector is stable to the liquid electrolyte until the potential becomes 0.4 V vs. $Li/Li^+$ or less.

3. The fluoride ion battery according to claim 1, wherein the anode current collector is stable to the liquid electrolyte until the potential becomes 0.2 V vs. $Li/Li^+$ or less.

4. The fluoride ion battery according to claim 1, wherein the anode active material is an active material that is fluorinated at the time of discharging.

5. The fluoride ion battery according to claim 1, wherein the electrolyte layer is electrolyte solution of an inorganic fluoride salt or organic fluoride salt in an organic solvent.

6. The fluoride ion battery according to claim 1,
wherein the liquid electrolyte layer comprises (i) an inorganic fluoride salt, (ii) at least one of Li amide salt and complex chemical compound comprising Li ion and a fluoride complex anion, and (iii) a glyme.

7. The A-fluoride ion battery according to claim 1,
wherein the liquid electrolyte layer comprises (i) an inorganic fluoride salt, (ii) at least one of Li amide salt and complex chemical compound comprising Li ion and a fluoride complex anion, and (iii) a cyclic carbonate.

8. The fluoride ion battery according to claim 1, wherein the cathode active material does not comprise a carbon material.

9. The fluoride ion battery according to claim 1, wherein the anode active material is Mg, $MgF_x$, Ca, $CaF_x$, Al, or $AlF_x$, wherein the "x" is a real number that is larger than 0.

10. The fluoride ion battery according to claim 9, wherein a theoretical potential (V vs. $Li/Li^+$) of $M/MF_x$ reaction in the anode active material (M) is 1 V or less, and a theoretical potential (V vs. $Li/Li^+$) of $M/MF_x$ reaction in the anode active material (M) is −1.0 V or more.

11. The fluoride ion battery according to claim 10, wherein the theoretical potential (V vs. $Li/Li^+$) of $M/MF_x$ reaction in the anode active material (M) is 0.5 V or less.

12. The fluoride ion battery according to claim 10, wherein the theoretical potential (V vs. $Li/Li^+$) of $M/MF_x$ reaction in the anode active material (M) is 0.3 V or less.

13. The fluoride ion battery according to claim 10, wherein the theoretical potential of $M/MF_x$ reaction in the anode active material (M) is higher than the potential at which the anode current collector reacts with a liquid electrolyte.

* * * * *